United States Patent [19]

Wilson et al.

[11] Patent Number: 5,051,245

[45] Date of Patent: Sep. 24, 1991

[54] AMMONIA FOR THE DESULFURIZATION OF SULFUR CONTAINING GASES

[75] Inventors: William G. Wilson, Pittsburgh, Pa.; D. Alan R. Kay, Burlington, Canada

[73] Assignee: Gas Desulfurization Corp., Pittsburgh, Pa.

[21] Appl. No.: 541,394

[22] Filed: Jun. 21, 1990

[51] Int. Cl.$^5$ .............................................. C01C 11/24
[52] U.S. Cl. ..................................... 423/242; 423/545
[58] Field of Search ................ 423/242 A, 545, 242 R

[56] References Cited

U.S. PATENT DOCUMENTS

| | | | |
|---|---|---|---|
| 1,782,590 | 11/1930 | Wietzel et al. | |
| 1,931,408 | 10/1933 | Hodsman et al. | 423/242 |
| 2,082,006 | 6/1937 | Johnstone | 23/178 |
| 2,161,056 | 6/1939 | Johnstone et al. | 23/178 |
| 2,600,253 | 6/1952 | Lutz | 71/54 |
| 2,862,789 | 12/1958 | Burgess | 23/119 |
| 2,912,304 | 11/1959 | Vlam-Ortumo et al. | 23/119 |
| 2,922,735 | 1/1960 | Johnstone | 162/83 |
| 3,522,000 | 7/1970 | Kinney | 423/242 |
| 3,579,296 | 5/1971 | Cann | 23/178 |
| 4,064,219 | 12/1977 | Yamashita et al. | 423/545 |

OTHER PUBLICATIONS

Chemical Kinetic Studies on Dry Sorbents-Literature Review, Wayne T. Davis, Timothy C. Keener, pp. 85-92.
Mechanism, Kinetics and Equilibrium of Thermal Decomposition of Ammonium Sulfate, Ind. Eng. Chem. Process Des. Develop., vol. 9, No. 4, 1970.
Sulfur Dioxide Reactions with Ammonia in Humid Air, Ind. Eng. Chem. Fundam., vol. 14, No. 1, 1975.
Removal of Sulfur and Nitrogen Oxides from Stack Gases by Ammonia, Chemical Engineering Progress Symposium Series.
Ammonia Injection: A Route to Clear Stacks, Advances in Chemistry Series 127, 1973.
Selective Catalytic Reduction for Coal-Fired Power Plants-Pilot Plant Results, EPRI, Apr., 1986.

Primary Examiner—Gregory A. Heller
Attorney, Agent, or Firm—Buchanan Ingersoll

[57] ABSTRACT

A process for the reduction of sulfur oxides from flue gases is provided in which ammonia is added to the flue gas to precipitate out $(NH_4)_2SO_4$. The $(NH_4)_2SO_4$ is collected and can be sold as a commercial product.

18 Claims, 1 Drawing Sheet

AMMONIA FOR THE DESULFURIZATION OF SULFUR CONTAINING GASES

BACKGROUND OF THE INVENTION

1. Field of the Invention

This invention relates to the use of ammonia ($NH_3$) for the desulfurization [removal of sulfur dioxide ($SO_2$)] of gases resulting from the combustion of sulfur containing hydrocarbons which are commonly called flue gases. The product of the reaction of $NH_3$ with $SO_2$ predominantly is ammonium sulfate $(NH_4)_2SO_4$ which is widely used as a source of nitrogen in materials such as fertilizers.

2. Description of the Prior Art

Processes for the desulfurization of gases containing $SO_2$ currently being evaluated to achieve the degree of desulfurization of flue gases proposed recently by the President of the United States are based on the use of calcium oxides and combinations of calcium oxide and oxides of the alkaline earth elements. These calcium oxide based and calcium oxide, alkaline earth oxides mixtures cannot be regenerated and must be discarded into landfills. As a result of more stringent enforcement of the regulations regarding landfills by the Environmental Protection Agency, (EPA) the number of landfills in the United States has decreased from 14,000 to 6000 in the last several years. It is estimated that there will be a further decrease of 33% in the number of landfills in the next several years. As a result the price of placing a ton of waste material into a landfill has increased from about $6 when 14000 landfills were in operation to four or five times that amount at present. When the number of landfills has been further reduced, the price of placing a ton of material in a landfill will increase further. It is estimated by the Wall Street Journal that 15 states will have no landfills available in 10 years.

If the recommendations of the President with regard to reduction of the components of acid rain are approved by the Congress, the large increase in partially sulfated calcium oxide sorbents resulting from $SO_2$ removal will occur at approximately the same time as the acute shortage of landfill sites. Therefore, there is a need for a method for reducing the $SO_2$ emissions from power plants that is based either on the use of regenerable sorbents or the use of a process that creates a sulfate material that is an item of commerce. The use of $NH_3$ for $SO_2$ removal from flue gases meets these requirements because they would result in the formation of $(NH_4)_2SO_4$ which is one of the most widely used chemicals known.

There are no research projects being funded in the current phase of the Clean Coal Technology Demonstration Program of the Department of Energy related to the use of $NH_3$ for the desulfurization of flue gases.

$NH_3$ is used in combination with catalysts for the Selective Catalytic Reduction (SCR) of nitrogen oxides ($NO_x$) However in Request For Proposal (RFP) by the Department of Energy (DOE) [No. DE-RP22-89PC89801] it was stated: "Depending on the lifetime of an SCR catalyst, annualized control costs (for SCR reduction of $NO_x$ with $NH_3$) are likely to be thousands of dollars per ton of $NO_x$ reduced from a high sulfur coal." The RFP further states: "Commercially available combustion modification techniques (e.g., certain low-$NO_x$ burners) and flue gas treatment processes (e.g. selective catalytic reduction) and selective noncatalytic reduction processes will not qualify" (as a technique applicable to this proposal).

The statements on the inapplicability of SCR removal of $NO_x$ with $NH_3$ is based on a report from the Electric Power Research Institute (EPRI) EPRI CS-3606, "Selective Catalytic Reduction for Coal-Fired Power Plants: Feasibility and Economics", Oct. 1984. This work documented the research effort by EPRI on the catalytic reduction of $NO_x$ with $NH_3$. The operating range of the catalyst was specified by the manufacturer to be 580° F. to 750° F. This required that the catalyst be placed in operation between the economizer and air preheaters of the boiler. The investigators showed that the catalyst did result in the reduction of $NO_x$ to nitrogen ($N_2$). The process was less than satisfactory because of the incomplete utilization of the $NH_3$ used. Furthermore, the investigators concluded that there was a conversion of 1.4% of the $SO_2$ by catalytic oxidation to $SO_3$. The unreacted $NH_3$ and $SO_3$ may have reacted to the fly ash. EPRI has reported the formation of compounds such as: $NH_4Al(SO_4)_2$, $NH_4Al(SO_4)_2 \times 12\ H_2O$ which account for over 42% of the deposits found in the air preheaters which were designed to have an exit temperature of 331° F. (161.1° C.). ($Al_2O_3$ constituted 25% of ash in the coal used in this trial.) These precipitates increased the pressure drop in the air preheaters to a level that interfered with the efficient operation of the boiler.

Applicants have determined by thermodynamic calculations that $SO_2$ may be removed with $NH_3$ without the utilization of the catalyst for the conversion of $SO_2$ to $SO_3$. However, use of a catalyst to convert $SO_2$ to $SO_3$ may be accelerated by the use of a catalyst.

SUMMARY OF THE INVENTION

The description of the invention is based on the removal of $SO_2$, one of the sulfur oxides created by the combustion of coal which is a sulfur containing mixture of carbon and hydrocarbons. The use of coal as the source of hydrocarbon, and $SO_2$ as the sulfur oxide to be removed from the products of combustion (flue gas), does not preclude the use of this invention for the removal of $SO_2$ and other oxides of sulfur resulting from the combustion of other hydrocarbons containing sulfur.

Applicants' invention to provide a process whereby sufficient $NH_3$ is added to the flue gases containing $SO_2$ (from which a significant portion of the fly ash has been removed) for sufficient $SO_2$ to react with the ammonia to form $(NH_4)_2SO_4$ to meet present and future requirements for $SO_2$ removal from steam boilers and the like. The $(NH_4)_2SO_4$ formed by the reaction of the $SO_2$, $NH_3$, $H_2O$ and oxygen in the flue gas would be of sufficient purity to be suitable for use in fertilizer as a source of $NH_3$. Applicants control the temperature at which the $NH_3$ is added to the flue gases to prevent the precipitation of $(NH_4)_2SO_4$ in the duct work or on the surfaces of heat exchangers of the boiler to prevent the accumulation of $(NH_4)_2SO_4$ in a manner which will interfere with the efficient and reliable operation of the boiler.

DESCRIPTION OF THE PREFERRED EMBODIMENTS

Figure 1:
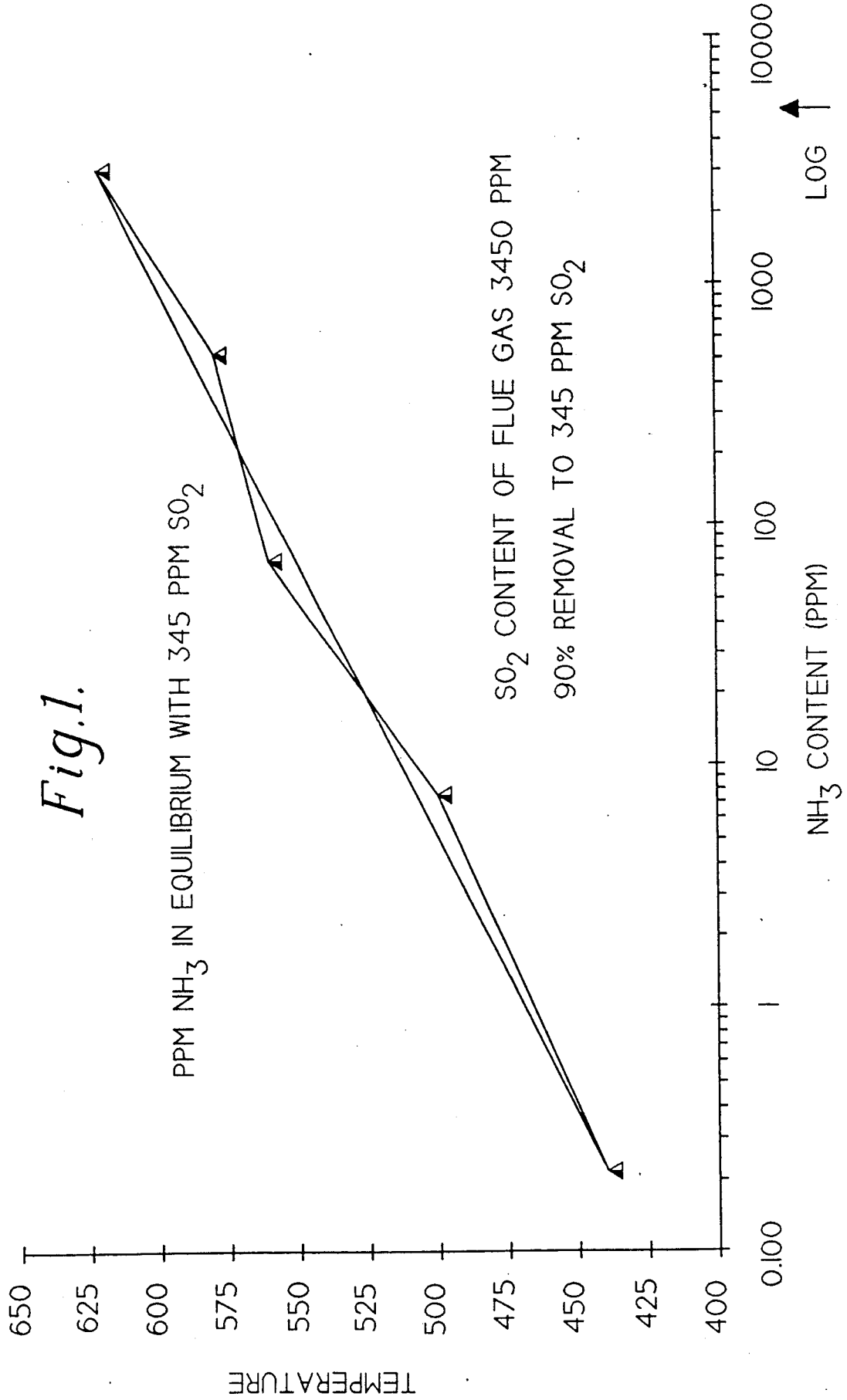
FIG. 1 shows the relationship between the amount of $NH_3$ in equilibrium with 345 ppm $SO_2$ (after 90% removal of $SO_2$ with $NH_3$) as a function of temperature.

The preferred embodiments of the invention may be described with the following equations:

$$SO_2(g) + \tfrac{1}{2}O_2(g) = SO_3 \tag{1}$$

Reaction (1) indicates that there always some $SO_3$ in If it is found desirable to increase the amount of $SO_3$, the stack gases may be exposed to a catalyst such as vanadium pentoxide or other catalysts known to those skilled in the art of converting $SO_2$ to $SO_3$ to increase the amount of $SO_3$ in the flue gases. However, when the $SO_3$ forms a compound with other elements such as described in equation (2) the reaction (1) proceeds further with the formation of more $SO_3$ from the remaining $SO_2$. In this system described by equations (1) and (2) the $SO_2$ is ultimately removed as $(NH_4)_2SO_4$ according to equation (3):

$$SO_3(g) + H_2O(g) + 2NH_3(g) = (NH_4)_2SO_4(s) \tag{2}$$

$$SO_2(g) + \tfrac{1}{2}O_2(g) + H_2O(g) + 2NH_3(g) = (NH_4)_2SO_4(s) \tag{3}$$

The amount of $(NH_4)_2SO_4$ formed is a function of the temperature at which the reaction occurs and the amount of $NH_3$ added to the flue gas stream.

Assuming the addition of enough $NH_3$ to react with 90% of the $SO_2$ in a typical fuel gas whose composition is:

| | |
|---|---|
| $CO_2$ | 13.21% |
| $H_2O$ | 9.21% |
| $N_2$ | 73.48% |
| $SO_2$ | 0.3450% |
| $O_2$ | 3.75% |
| NO | 0.075% |
| $N_2O$ | 0.0025% | it is possible to compute the amount of $NH_3$ required in excess of the stoichiometric amount to achieve 90% $SO_2$ reduction (to 345 ppm $SO_2$) at any temperature. Calculations over a range of temperatures from 440.6° F. to 620.0° F. have been made, and these results have been plotted in FIG. 1. The data shows that at 620.0° F., 2904.6 ppm of $NH_3$ are necessary to be in equilibrium with 345 ppm of $SO_2$. When the temperature is reduced to 440.6° F., only 0.207 ppm of $NH_3$ is necessary to be in equilibrium with 345 ppm $SO_2$. These two temperatures are within the operating range of the air preheaters (675° F. to 331° F.) utilized in the EPRI experiments which accounts for the precipitation of the ammonia and sulfur oxide containing material in the air preheaters. The analysis of some of 42% of the compounds found in the deposits in the air preheats reported by EPRI include: $NH_4Al(SO_4)_2$ and $NH_4Al(SO_4)_2 \times 12 H_2O$. These analyses of the materials found in the preheaters are not surprising considering the possibility of the particles of fly ash in the flue gas acting as heterogeneous nuclei on which the $(NH_4)_2SO_4$ would precipitate. Precipitation of the $(NH_4)_2SO_4$ containing material in the air preheaters confirms the validity of the calculations given above.

It is an established fact that materials used as heterogeneous nuclei are most effective when the planar disregistry between the nucleating material and the material being nucleated is a minimum. Applicants further provides that heterogeneous nuclei whose planar disregistry is minimal such as solid particles of $(NH_4)_2SO_4$ can be utilized to accelerate the precipitation of the ammonium sulfate particles according to the reaction described in equation (3). The use of $(NH_4)_2SO_4$ in the previous sentence does not preclude the use of other heterogeneous nuclei whose planar disregistry with respect to $(NH_4)_2SO_4$ is minimal.

Since all of the reactants shown in equation (3) are gases, the rate of reaction for the formation of $(NH_4)_2SO_4$ should be rapid. This is in sharp contrast to the reactions for removal of sulfur from flue gases which are either (1) between solids and gases [$SO_2$ (gas) and CaO (solid)] where the limiting rate of reaction may be the diffusion of the $SO_2$ into the crystals of CaO or (2) the case where the CaO is in a slurry the $SO_2$ must be absorbed by the water of the slurry and react with the suspended CaO where the rate determining reaction may be the diffusion of the $SO_2$ into the CaO particles in the slurry. All of these reactions which require the diffusion of a gas into a solid are very slow compared to the reaction between intimately mixed gas species. The fact that the $NH_3$ containing compounds precipitated in the short time necessary for the flue gases to traverse the air preheaters attests to the speed of the reaction of $NH_3$ and $SO_2$ to form $(NH_4)_2SO_4$.

If $(NH_4)_2SO_4$ of sufficient purity for fertilizer use is to be produced, at least some of the fly ash must be removed from the flue gas stream prior to the addition of the $NH_3$ into the flue gas. Removal may be by venturi scrubbers, fabric filter, electro-static precipitators or other means known to those skilled in the art. Since analysis of ammonium sulfate particles found in the air preheaters indicates that the fly ash may have acted as a heterogeneous nuclei for the growth of ammonium sulfate crystals, complete removal of the fly ash may not be desirable.

According to the information contained in FIG. 1, at 500° F. less than 5 ppm of $NH_3$ is required to be in equilibrium with 345 ppm $SO_2$ after 90% $SO_2$ removal. Therefore, in order to collect as much of the valuable ammonium sulfate as possible, the crystals of ammonium sulfate, whose size may have been increased by providing heterogeneous nuclei to increase their rate of growth, should be extracted from the flue gas stream as soon after the $SO_2$ of the flue gas has completely reacted with the $NH_3$ addition with techniques known to those skilled in the art such as fabric filters, venturi filters and electro-static precipitators.

The products of the reaction of $NH_3$ and $SO_2$, which are mainly $(NH_4)_2SO_4$, should be removed from the duct work while the temperature of the flue gas exceeds its dew point. Otherwise, the precipitating water may react with the $(NH_4)_2SO_4$ to form a solution which may interfere with the extraction of the $(NH_4)_2SO_4$ from the duct work. Otherwise the $(NH_4)_2SO_4$ may precipitate throughout the duct work of the boiler making it difficult to accumulate it for sale.

While we have described a present preferred embodiment of the invention, it is to be distinctly understood that the invention is not limited thereto but may be otherwise embodied and practiced within the scope of the following claims.

We claim:

1. A process for the rapid reduction of sulfur oxides from the products of combustion of sulfur containing hydrocarbons with ammonia which results in the formation of an ammonium sulfate compound which is a item of commerce comprising the steps of (a) removing at least part of the fly ash in the flue gas stream prior to the addition of the reactant necessary for the removal of the sulfur containing oxides, the temperature of said flue gas being in the range of approximately 440° F. to approximately 620° F.

(b) adding gaseous ammonia to the flue gas stream, said ammonia reacting with said sulfur oxides, said ammonia added in at least sufficient quantity to reduce the sulfur oxides to meet the requirements for sulfur emissions form process heaters, said ammonia added in the flue gas stream at a position in the boiler duct work where the products of the reaction do not come in contact with heat exchangers in the duct work downstream of the site of the ammonia addition;

(c) providing heterogeneous nuclei int he flue gas stream to promote the rapid growth of the crystals of the products of reaction; and (d) removing the products of the reaction of the ammonia and the sulfur oxides from the flue gases after the reaction has gone to completion.

2. The process in claim 1 wherein the sulfur oxide to be removed is mainly sulfur dioxide ($SO_2$).

3. The process in claim 1 wherein the sulfur oxide to be removed is $SO_3$ which has been produced by the exposure of $SO_2$ in the flue gas to a catalyst for the conversion of $SO_2$ to $SO_3$.

4. The process in claim 1 wherein sufficient fly ash is removed from the flue gas stream prior to the addition of the ammonia to increase the concentration of the $(NH_4)_2SO_4$ in the particulate matter in the flue gas to meet the chemical specifications for $(NH_4)_2SO_4$ for commercial applications.

5. The process in claim 4 wherein sufficient fly ash is removed from the flue gas stream prior to the addition of the ammonia to increase the purity of the $(NH_4)_2SO_4$ for applications of $(NH_4)_2SO_4$ requiring reduced quantities of elements and compounds other then $(NH_4)_2SO_4$.

6. The process in claim 1 wherein the heterogeneous nuclei are provided by the fly ash remaining in the flue gas stream.

7. The process in claim 1 wherein the heterogeneous nuclei provided to increase the rate of crystal growth of the ammonium sulfate resulting from the reaction of the $NH_3$ and $SO_2$ have crystal sizes which have a minimum of difference in planar disregistry between the particle doing the nucleation and the ammonium sulfate being formed.

8. The process in claim 1 wherein the amount of ammonia to be added to the flue gas stream is sufficient to reduce the $SO_2$ content of the flue gas stream to meet present and future requirements for sulfur emissions from process heaters.

9. The process in claim 1 wherein the temperature at which the $(NH_4)_2SO_4$ is removed from the duct work is in excess of the dew point of the flue gas.

10. The process in claim 1 wherein the amount of ammonia to be added is sufficient to maximize the production of $(NH_4)_2SO_4$.

11. The process in claim 1 wherein the $(NH_4)_2SO_4$ is removed after completion of the reaction to minimize the amount of $(NH_4)_2SO_4$ remaining in the duct work.

12. The process in claim 11 wherein one of a venturi filter, fabric filter, cyclone, and electro-static precipitator are used to remove the ammonium sulfate after completion of the reactions.

13. The process in claim 1 wherein there are no heat exchangers in the duct work of the boiler between the point of entry of the $NH_3$ and point where the $(NH_4)_2SO_4$ crystals are extracted from the flue gas.

14. The process in claim 1 wherein the amount of $NH_3$ added is in excess of the stoichiometric amount required to achieve 90% reduction of the $SO_2$ content of said flue gas.

15. The process in claim 1 wherein said products of reaction of the ammonia and sulfur oxides from said flue gas are removed from the duct work while the temperature of said flue gas is above the dew point.

16. The process in claim 15 further comprising the step of introducing said flue gas into at least one heat exchanger after removal of said products of the reaction of the ammonia and the sulfur oxides.

17. The process in claim 1 further comprising the step of introducing said flue gas into at least one heat exchanger after removal of said products of the reaction of the ammonia and the sulfur oxides.

18. A process for the rapid reduction of sulfur oxides from the products of combustion of sulfur containing hydrocarbons with ammonia which results in the formation of an ammonium sulfate compound which is an item of commerce comprising the steps of (a) removing at least part of the fly ash in the flue gas stream prior to the addition of the reactant necessary for the removal of the sulfur containing oxides, the temperature of said flue gas being less than approximately 620° F. and greater than the dew point of said flue gas;

(b) adding gaseous ammonia to the flue gas stream, said ammonia reacting with said sulfur oxides, said ammonia added in at least sufficient quantity to reduce the sulfur oxides to meet the requirements for sulfur emissions from process heaters, said ammonia added in the flue gas stream at a position in the boiler duct work where the products of the reaction do not come in contact with heat exchangers in the duct work downstream of the site of the ammonia addition;

(c) providing heterogeneous nuclei in the flue gas stream to promote the rapid growth of the crystals of the products of reaction; an (d) removing the products of the reaction of the ammonia and the sulfur oxides from the flue gases after the reaction has gone to completion.

* * * * *

UNITED STATES PATENT AND TRADEMARK OFFICE
CERTIFICATE OF CORRECTION

PATENT NO.  : 5,051,245

DATED       : September 24, 1991

INVENTOR(S) : WILLIAM G. WILSON, D. ALAN R. KAY

It is certified that error appears in the above-identified patent and that said Letters Patent is hereby corrected as shown below:

Column 3, line 9, after there insert --is--.

Column 3, line 9, after "in" insert --equilibrium with $SO_2$ even though the amount of $SO_3$ may be small.--.

Column 5, line 17, claim 1, change "int he" to --in the--.

Signed and Sealed this

Twenty-third Day of February, 1993

*Attest:*

STEPHEN G. KUNIN

*Attesting Officer*     Acting Commissioner of Patents and Trademarks